(12) United States Patent
Gien et al.

(10) Patent No.: US 7,165,178 B2
(45) Date of Patent: Jan. 16, 2007

(54) SYSTEM AND METHOD FOR FACILITATING SIGNING BY BUYERS IN ELECTRONIC COMMERCE (75) Inventors: Peter H Gien, Red Bank, NJ (US); Thomas Hetschold, Offenbach (DE); Joachim Vance, Mission Viejo, CA (US)

(73) Assignee: Identrus LLC, New York, NY (US)

( * ) Notice: Subject to any disclaimer, the term of this patent is extended or adjusted under 35 U.S.C. 154(b) by 461 days.

(21) Appl. No.: 09/929,035

(22) Filed: Aug. 14, 2001

(65) Prior Publication Data
US 2002/0165827 A1 Nov. 7, 2002

Related U.S. Application Data (60) Provisional application No. 60/224,994, filed on Aug. 14, 2000.

(51) Int. Cl.
H04L 9/00 (2006.01)
(52) U.S. Cl. ............ 713/176; 713/169; 713/170; 705/67
(58) Field of Classification Search ........... 713/170, 713/165, 176
See application file for complete search history.

(56) References Cited

U.S. PATENT DOCUMENTS

| 5,659,616 | A |  | 8/1997 | Sudia |
| 5,717,989 | A |  | 2/1998 | Tozzoli et al. |
| 5,842,211 | A |  | 11/1998 | Horadan et al. |
| 5,845,260 | A |  | 12/1998 | Nakano et al. |
| 5,850,442 | A |  | 12/1998 | Muftic |
| 5,944,789 | A |  | 8/1999 | Tzelnic et al. |
| 6,085,321 | A | * | 7/2000 | Gibbs et al. ............ 713/170 |
| 6,363,479 | B1 | * | 3/2002 | Godfrey et al. ........ 713/160 |
| 6,385,651 | B1 | * | 5/2002 | Dancs et al. ............ 709/227 |

OTHER PUBLICATIONS

MasterCard Int'l Inc. Operations Manual §§5.11-5.14 (Nov. 1993).

* cited by examiner

Primary Examiner—Kambiz Zand
(74) Attorney, Agent, or Firm—Sonnenschein Nath & Rosenthal LLP

(57) ABSTRACT

A signing interface is disclosed for facilitating digital signing of electronic messages by a buyer or other subscribing party in an e-commerce or other context. The signing interface provides a mechanism by which a seller's Web applications may invoke a buyer's smartcard subsystem or other signing module to execute a digital signature. The signing interface preferably comprises a signing interface library and a signing plug-in resident on the buyer's computer. The signing interface library is preferably implemented as a Java package and associated libraries that are installed locally on the buyer's computer and made accessible to signed Java applets provided by the seller's Web server. The signing plug-in is preferably implemented as a plug-in, ActiveX control, or similar code that is installed locally on the buyer's computer and made accessible through the buyer's Web browser using an embedded browser object on a seller's Web page. In a preferred embodiment, the signing interface may be adapted to facilitate access to system services such as a warranty service provided via a four-corner trust model.

48 Claims, 6 Drawing Sheets

SYSTEM AND METHOD FOR FACILITATING SIGNING BY BUYERS IN ELECTRONIC COMMERCE

This application claims priority from U.S. provisional application Ser. No. 60/224,994, filed Aug. 14, 2000, entitled Signing Interface Requirements, Smart Card Compliance Requirements, Warranty Service Functional Requirements, and Additional Disclosure, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The world of electronic commerce has created new challenges to establishing relationships between contracting parties. One of those challenges springs from the fact that the parties to the transaction cannot see or hear each other, and cannot otherwise easily confirm each other's identity and authority to act.

One remedy for this problem is to provide each contracting party with a private key for signing transmitted messages with a digital signature. The signing party makes available an associated public key that decrypts messages signed with the party's private key, and thus enables a receiving party to confirm the identity of the sender.

The digital signature is typically created by a smartcard subsystem or other signing module resident on the signing party's computer. This subsystem comprises a smartcard which stores the signing party's private key as well as a smartcard reader and any necessary software for executing the digital signature.

But although such smartcard subsystems adequately provide basic signing capability, they fail to provide significant functionality that would simplify digital signing in a variety of contexts and, in particular, in a variety of e-commerce contexts.

For example, such smartcard subsystems typically do not include API (Application Program Interface) functions for different browser types, including the most popular browser types. Consequently, it is difficult for a browser to invoke the smartcard subsystem to sign data. Moreover, in many e-commerce contexts, it may be desirable for practical purposes to have the merchant's Web server control the dialogue with the customer's browser and determine the appropriate point in the dialogue when data needs to be signed. The lack of appropriate API functions in existing smartcard subsystems makes it difficult for a merchant's Web application to invoke such smartcard subsystems to generate a digital signature.

Moreover, smartcard subsystems manufactured by different vendors may have very different data-formatting requirements for digital-signature requests and may generate differently-formatted digital signatures. This makes it difficult to design standard Web applications for invoking a smartcard subsystem. In fact, such data-formatting differences may require a separate version of each Web application to be created for each different smartcard subsystem to be supported.

This need for multiple application versions presents special problems in an e-commerce setting. A merchant Web site may include a number of Web applications that call for a buyer to digitally sign data associated with a transaction. When variations in smartcard subsystems require multiple versions of each Web application, the difficulty and cost of developing such applications rises dramatically and may become prohibitive.

SUMMARY OF THE INVENTION

A signing interface is disclosed for facilitating digital signing of electronic messages by a buyer or other subscribing party in an e-commerce or other context. The signing interface provides a mechanism by which a seller's Web applications may invoke the buyer's smartcard subsystem or other signing module to execute a digital signature.

The signing interface preferably comprises a signing interface library and a signing plug-in resident on the buyer's computer. The signing interface library is preferably implemented as a Java package and associated libraries that are installed locally on the buyer's computer and made accessible to signed Java applets provided by the seller's Web server.

The use of a Java library interface allows the seller to request the buyer's identity signature in a simple and standard way. This method also allows the communication between buyer and seller to be extremely flexible, since the seller provides the Java applet. The specification for transporting the data to the signing interface library and transporting the signature back to the seller's Web application is not fixed and can change depending on the seller's needs and requirements.

When a seller's Web application determines that there is data that should be signed by the buyer, a Web page is sent to the buyer's browser that contains a reference to the seller's Java applet. The applet initiates communication with the seller's Web server and retrieves the data to be signed. The signing interface library receives the data to be signed, receives approval from the buyer to execute the digital signature, and invokes the smartcard subsystem to digitally sign the data.

The signing plug-in is preferably implemented as a plug-in, ActiveX control, or similar code that is installed locally on the buyer's computer and made accessible through the buyer's Web browser using an embedded browser object on a seller's Web page.

When a seller's Web application determines that there is data that should be signed by the buyer, a Web page is sent to the buyer's browser that contains an appropriate embedded browser object causing the signing plug-in to execute. The signing plug-in retrieves the data to be signed from a location specified in the embedded browser object or from the object itself, receives approval from the buyer to execute the digital signature, and invokes the smartcard subsystem to digitally sign the data.

In a preferred embodiment, the signing interface may be adapted to facilitate access to system services provided via a four-corner trust model. The four-corner model preferably comprises the buyer, also referred to as the subscribing customer, and the seller, also referred to as the relying customer, who engage in an on-line transaction.

The four-corner model also preferably comprises a first financial institution, referred to as the issuing participant. The issuing participant acts as a certificate authority for the buyer and issues the buyer a hardware token including a private key and a digital certificate signed by the issuing participant.

The four-corner model also preferably comprises a second financial institution, referred to as the relying participant. The relying participant acts as a certificate authority for the seller and issues the seller a hardware token including a private key and a digital certificate signed by the relying participant. The system also includes a root certificate authority that issues digital certificates to the issuing and relying participants.

In a preferred embodiment, when a seller requires a digital signature from the buyer to be accompanied by a warranty, the buyer's signing interface prompts the buyer to determine whether the buyer would like to request a warranty for the digital signature and, if so, requests the warranty from the buyer's issuing participant. The issuing participant determines whether it will issue the warranty and, if so, transmits the warranty to the buyer so that it may be included with the executed digital signature returned to the seller.

The signing interface of the present invention provides several advantages over the prior art. First, it provides a standardized framework for facilitating and executing digital signatures. Accordingly, the seller need not design and run different Web applications for different configurations of the buyer's computer and smartcard subsystem. Moreover, the seller can be assured that the signature returned to it by the buyer will be in a form that it can use.

Second, because the signing interface displays the data to be signed to the buyer before executing the signature and because the signing interface comprises trusted software issued to the buyer under contract with its issuing participant, the buyer can be assured that he or she knows what is being signed and that the data to be signed will not be altered by any code in the seller's Web application.

The features and advantages described in the specification are not all inclusive, and additional features and advantages will be apparent to one of ordinary skill in the art in view of the drawings, specification, and claims hereof.

BRIEF DESCRIPTION OF THE DRAWINGS

The above summary of the invention will be better understood when taken in conjunction with the following detailed description and accompanying drawings, in which:

FIG. 5 illustrates a preferred embodiment for using a signing plug-in; and

DETAILED DESCRIPTION OF THE PREFERRED EMBODIMENTS

The present disclosure relates to a system and method for facilitating digital signing and, in particular, digital signing by transacting parties in an electronic commerce setting. In a preferred embodiment, the system and method are implemented in the context of a four-corner trust model. A preferred embodiment of the four-corner model is shown in FIG. 1.

Figure 1:
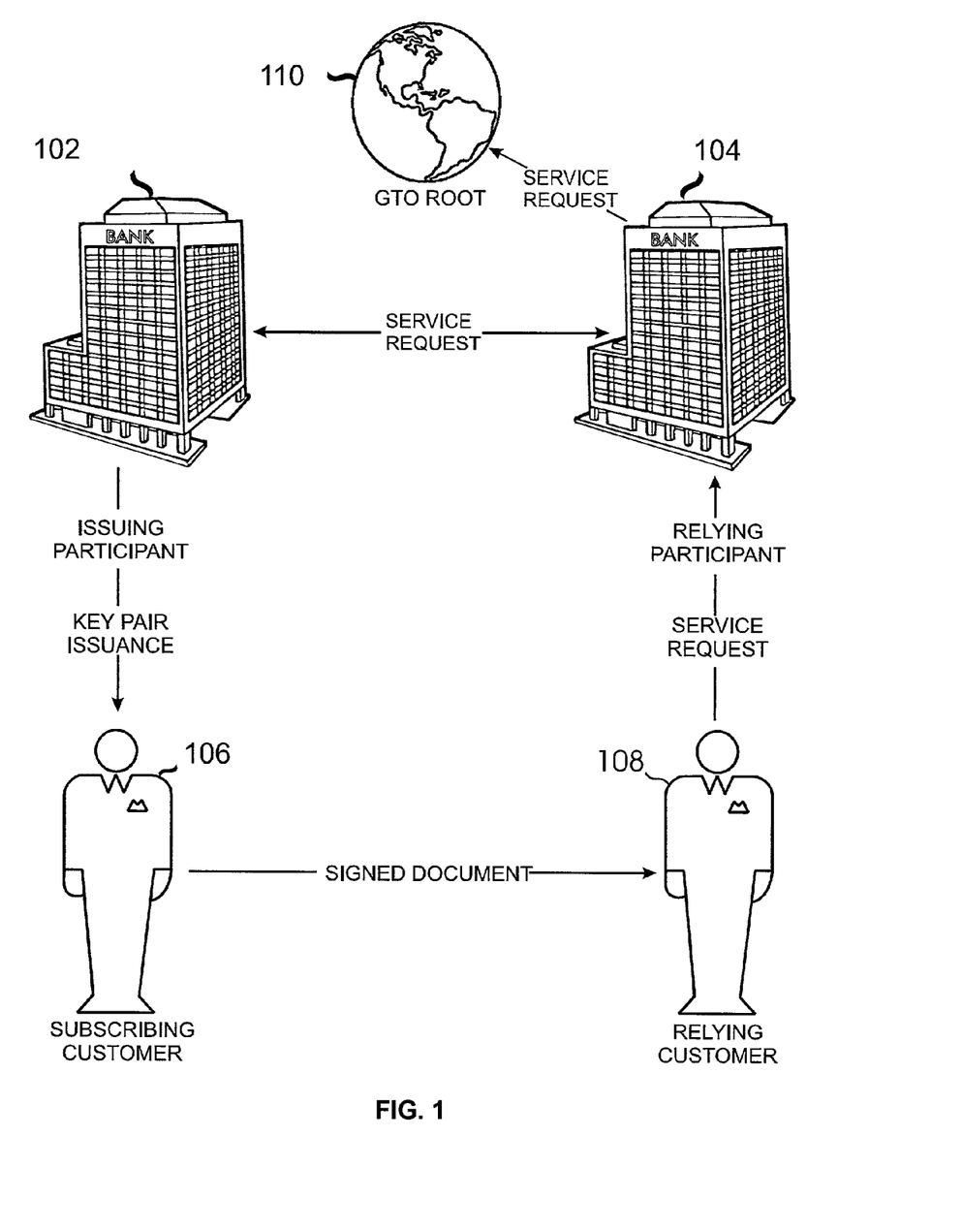
FIG. 1 is a block diagram of a preferred embodiment of the four-corner model employed by the present system.

As shown in FIG. 1, the four-corner model preferably comprises a first institution 102 and a second institution 104. First institution 102 is referred to as the "issuing participant" because it is a participant in the present system and issues smartcards to its customers, as described below. Second institution 104 is referred to as the "relying participant" because it is a participant in the present system and its customers rely on representations made by issuing participant 102 and issuing participant 102's customers, as described below. Participants 102, 104 may preferably be banks or other financial institutions.

Also shown in FIG. 1 are a first customer 106 and a second customer 108. First customer 106 and second customer 108 are preferably customers of issuing participant 102 and relying participant 104, respectively. First customer 106 is referred to as the "subscribing customer" because this customer subscribes to services provided by issuing participant 102. First customer 106 is also referred to as the "buyer" because it typically fills that role in transactions with second customer 108, as described below.

Second customer 108 is referred to as the "relying customer" because it relies on representations made by both issuing participant 102 and subscribing customer 106, as described below. Second customer 108 is also referred to as the "seller" or "merchant" because it typically fills that role in transactions with first customer 106, as described below. It should be recognized, however, that although the description below speaks primarily in terms of a buyer 106 and a seller 108, first customer 106 and second customer 108 may instead have different roles in a given transaction. For example, first customer 106 may be a borrower repaying a loan to second customer 108.

Also shown in FIG. 1 is a root entity 110. Root entity 110 is typically an organization that establishes and enforces a common set of operating rules for facilitating electronic commerce and electronic communications. Root entity 110 may be owned jointly by a plurality of banks and/or other financial institutions that have agreed to adhere to these operating rules. One exemplary embodiment of such a root entity is described in copending application Ser. No. 09/502,450, filed Feb. 11, 2000, entitled System and Method for Providing Certification Related and Other Services and in copending application Ser. No. 09/657,623, filed Sep. 8, 2000, entitled System and Method for Providing Certificate-Related and Other Services, which are hereby incorporated by reference.

Figure 2:
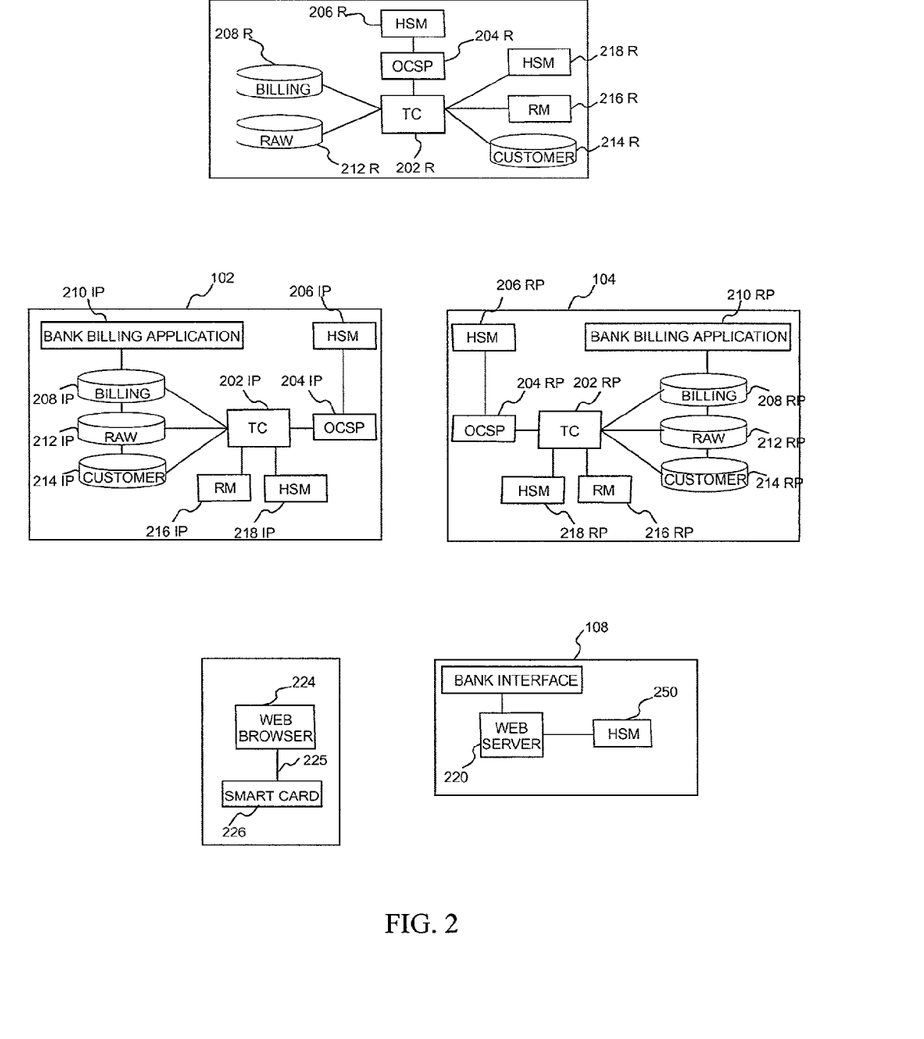
FIG. 2 illustrates components preferably provided at certain entities in the four-corner model.

FIG. 2 illustrates the components preferably provided at relying customer 108 and subscribing customer 106 in the present system. As shown in FIG. 2, relying customer 108 is preferably provided with a Web server 220 adapted to serve Web pages and other Web content via the Internet. Relying customer 108 is further preferably provided with a bank interface 222 for accessing services from relying participant 104. An exemplary bank interface is described in copending application Ser. No. 09/657,604, filed on Sep. 8, 2000, entitled System and Method for Facilitating Access by Sellers to Certificate-Related and Other Services. Relying customer 108 is further preferably provided with a hardware security module 250 for executing and verifying digital signatures.

As further shown in FIG. 2, subscribing customer 106 is preferably provided with a Web browser 224 adapted to transmit requests for Web pages and other Web content via the Internet, and to receive responses to those requests.

subscribing customer 106 is further preferably provided with a smartcard subsystem 226 for signing transaction data. Smartcard subsystem 226 preferably includes a smartcard, a card reader, and any necessary software for executing digital signatures. An exemplary set of requirements for a smartcard and associated subsystem components is described in provisional application Ser. No. 60/224,994, filed Aug. 14, 2000, entitled Signing Interface Requirements, Smart Card Compliance Requirements, Warranty Service Functional Requirements, and Additional Disclosure and U.S. application Ser. No. 09/928,999 filed Aug. 14, 2001, entitled System and Method for Secure Smartcard Issuance, which are hereby incorporated by reference. Smartcard subsystem 226 may also be referred to as a smartcard "black box" because, in accordance with the present invention, seller 108 may invoke smartcard subsystem 226 without knowing any details of the subsystem's design or operation. In a preferred embodiment, the components that make up smartcard subsystem 226 are provided to buyer 106 by its issuing participant 102.

In a preferred embodiment, the smartcards issued to subscribing customer 106 and relying customer 108 are each provided with two private keys and corresponding digital certificates: an identity private key and corresponding certificate, and a utility private key and corresponding certificate.

The identity private key is used to produce digital signatures that are required by root entity 110 as evidence of an entity's contractual commitment to the contents of an electronic transaction, such as a purchase order or a warranty request.

The utility private key is preferably used to produce digital signatures that allow additional transactional security. Typically, utility certificates are used to support SSL, to sign S/MIME messages, and for other utility applications. Any reference in this document to a "certificate" refers to an identity certificate unless otherwise stated.

Subscribing customer 106 is also preferably provided with a signing interface 225. Signing interface 225 interfaces browser 224 with smartcard subsystem 226 and facilitates digital signing of data associated with a wide variety of Web applications, as described in more detail below.

Figure 3:
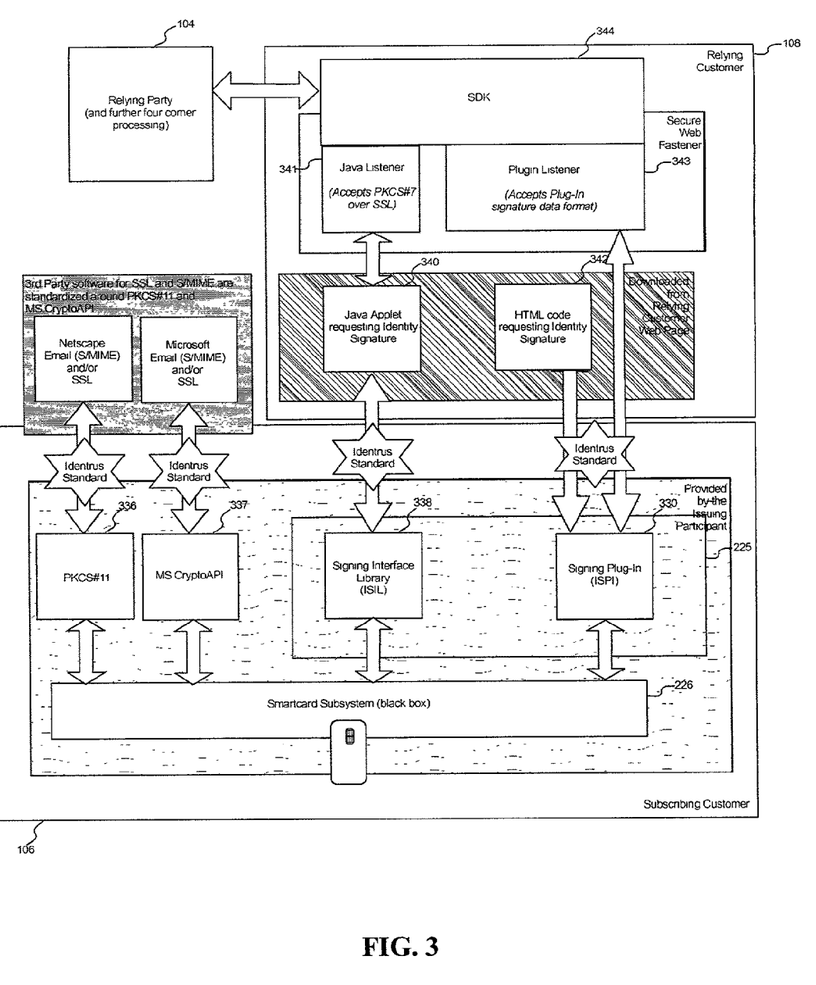
FIG. 3 illustrates software components present at the subscribing customer and the relying customer in a preferred embodiment.

FIG. 3 illustrates the components provided at subscribing customer 106 and relying customer 108 in greater detail. As shown in FIG. 3, signing interface 225 preferably comprises a signing interface library 338 and a signing plug-in 339. Signing interface library 338 and signing plug-in 339 provide a standardized application programming interface (API) that may be used by Web applications from relying customer 108 to access smartcard subsystem 226's signing functionality. These Web applications may include, for example, a Java applet 340 designed to access smartcard subsystem 226 via interface library 338 and a Web page 342 designed to access smartcard subsystem 226 via signing plug-in 339, as described in more detail below.

In a preferred embodiment, the relying customer's browser may also be provided with additional APIs, such as a PKCS#11 336 and a MS CryptoAPI 337, to provide access to smartcard subsystem 226 for third party software, such as Netscape's or Microsoft's secure multipurpose internet mail extension (S/MIME) software and/or secure sockets layer (SSL) software.

Signing Interface Library 338

In a preferred embodiment, signing interface library 338 comprises a Java API that allows a merchant's Web applications to invoke the signature functions of smartcard subsystem 226. The library is preferably implemented as a Java package and associated libraries that are installed locally on subscribing customer 106's computer and made accessible to signed Java applets provided by relying customer 108. The Java package is preferably signed by, and received from, an entity trusted by subscribing customer 106, such as its issuing participant 102.

Signing interface library 338 preferably communicates with smartcard subsystem 226 via a standard smartcard interface. For example, the smartcard interface may be PKCS #11 with a Java native interface layer or a pure Java Smart Card interface, such as Open Card Framework (OCF). Indeed, any known technique may be used to interface to smartcard subsystem 226, as long as it does not affect the system's ability to provide the signing interface library API described below. Moreover, the implementation of such interface need not comply with any specific smartcard interface standard.

In a preferred embodiment, smart card 226 returns the signed data in PKCS #7 format, as described below. This format is the same format used by Netscape's JavaScript crypto.signText( ) method. PKCS #7 is also a standard used for signatures in S/MIME implementations.

Figure 4:
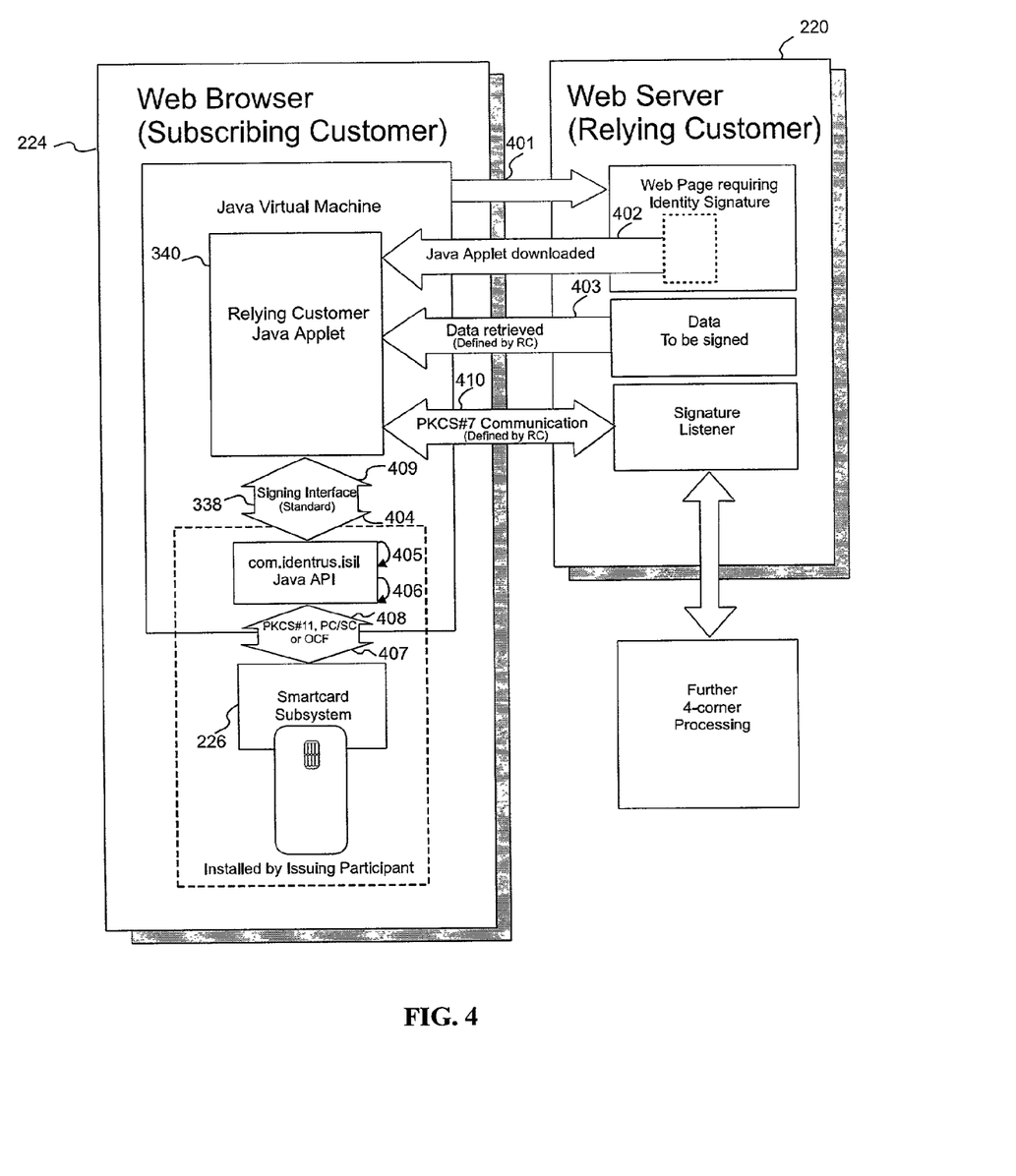
FIG. 4 illustrates a preferred embodiment for using a signing interface library.

FIG. 4 illustrates use of the signing interface library in a preferred embodiment. As shown in FIG. 4, in step 401, subscribing customer 106 visits relying customer 108's Web site. The parties preferably authenticate themselves to each other over an SSL session with their utility keys.

In step 402, when the seller's Web application determines that there is data that should be signed by buyer 106, a Web page is sent to browser 224 that contains a reference to a Java applet 340. In step 403, Java applet 340 initiates communication with Web server 220 and retrieves the data to be signed. In step 404, Java applet 340 initiates communication with signing interface library 338 and sends a signing request to signing interface 338 that includes the data to be signed.

In step 405, signing interface library 338 displays a signing-request dialog to buyer 106. The signing-request dialog displays the data to be signed to buyer 106 and asks the buyer whether or not he or she agrees to sign the data or would like to cancel the signing operation. Alternatively, this step may be performed by smartcard subsystem 226.

In a preferred embodiment, the signing-request dialog offers buyer 106 the option to view the data to be signed in an application of his or her choice (e.g., a spreadsheet application) before deciding whether or not to proceed with signing. In addition, the signing-request dialog also offers buyer 106 the option to store or log the data to be signed.

In step 406, if buyer 106 elects to sign the data, signing interface library 338 prompts subscribing customer 106 for its PIN. In step 407, once the buyer enters the PIN, signing interface library 338 transmits the data to be signed to smartcard subsystem 226. In step 408, smartcard subsystem 226 signs the data and returns the digital signature to signing interface library 338. In step 409, signing interface library 338 returns the signed data to Java applet 340. In step 410, Java applet 340 sends the signed data to Web server 220 for verification and further processing.

A preferred embodiment of a signing interface library API is as follows:

0.1 Signing Interface Library API 0.1.1 Class Signature com.rootentity.isil

Class Signature public class Signature

Constructor Detail
   Signature
   public Signature( ) {Implementation Required}
   This constructor should instantiate and load any underlying smartcard subsystem without initiating a session to the smartcard. Sessions are started by the init method.

Method Detail
   getSupportedVersions
public String getSupportedVersions( ) {Implementation Required}
   The getSupportedVersions method returns the version of the API implemented. The stringreturned contains a comma delimited list of hundreds based version numbers. 100 equals version 1.00.
      init public void init( ) throws SigningInterfaceException {Implementation Required}
   The init method initializes the interface and opens a session to the smartcard
      requestIdentitySignature
      public java.lang.String requestIdentitySignature (byte[ ] data, String mime-type String filename) throws SigningInterfaceException {Implementation Required}
   The requestIdentitySignature method uses the identity key to sign the data provided. The data is displayed to the user along with an interface allowing them to authorize the signing or cancel the operation.
   The mime-type parameter allows the signing system to know what format the data is so that it can best determine how the data should be displayed to the user.
   It is understood that some mime types are not supported. The mime type "text/plain" shall be supported. Unsupported mime types shall throw the appropriate exception.
   The filename allows for a default filename if the user saves the data to a file using the "Save" option. In a preferred embodiment, this filename parameter allows the relying customer to provide more information to the user about the data they are being asked to sign. The filename parameter can also help in allowing the signing system to determine how the data should be presented to the user.
      Parameters
         data—Required. The data to be signed as a byte array.
         mime-type—Required. The MIME type of the data to be signed. This should be in the format shown in the following example:
         text/plain
         filename—Optional filename to be used for saving the data. In a preferred embodiment it may also be used as a guide for determining the data type where the MIME type is not sufficient.
      Returns
         The signature as a Base64 encoded PKCS #7 object.
      Throws
         SigningInterfaceException—If an unrecoverable error occurs in the process of attempting to perform a signature, this exception is thrown. The error is specified by the error code of the SigningInterfaceException object.
      requestIdentitySignature
      public java.lang.String requestIdentitySignature (InputStream datastream, String mime-type, String filename) throws SigningInterfaceException {Implementation Required}
   The requestIdentitySignature method uses the identity key to sign the data stream provided. The data is displayed to the user along with an interface allowing them to authorize the signing or cancel the operation.
   This method adds an InputStream parameter rather than a byte[ ] array to pass the data to the signing system. An InputStream may be more appropriate for passing large amounts of data (e.g., greater than 1 megabyte) to be signed by the signing system. This absolves the calling application from having to allocate large amounts of memory to store the data, which may result in out of memory errors.
   The signing system should expect that this InputStream may contain large amounts of data (greater than 1 megabyte) and be able to handle the data appropriately to avoid out of memory errors.
   It is understood that some mime types are not supported. The mime type "text/plain" shall be supported. Unsupported mime types shall throw the appropriate exception.
      Parameters
         datastream—Required. The data to be signed
         mime-type—Required MIME type of the data to be signed
         filename—Optional filename to be used for saving the data as well as a guide for determining the data type where the MIME type is not sufficient.
      Returns
         The signature as a Base64 encoded PKCS #7 object.
      Throws
         SigningInterfaceException—If an unrecoverable error occurs in the process of attempting to perform a signature, this exception is thrown. The error is specified by the error code of the SigningInterfaceException object.
      GetUtilitySignature
public java.lang.String getUtilitySignature (byte[ ] data) throws SigningInterfaceException {Implementation Optional}
   The getUtilitySignature method uses the utility certificate to sign the data provided. Unlike requestIdentitySignature, the data does not need to be displayed to the user along with an interface allowing them to authorize the signing or cancel the operation.
      Parameters
         data—Required. The data to be signed
      Returns
         The signature as a Base64 encoded PKCS #7 object.
      Throws
         SigningInterfaceException—If an unrecoverable error occurs in the process of attempting to perform a signature, this exception is thrown. The error is specified by the error code of the SigningInterfaceException object.
      doFinal
      public void doFinal( ) {Implementation Required}
      The final method closes the session with the Smart Card.

0.1.2 Class SigningInterfaceException
   This class defines the possible error codes of the ISIL implementation. The actual value of the codes is preferably not used directly as the value may vary between implementations. Instead, the values are preferably compared against the named constants to determine the actual error.
com.rootentity.isil Class SigningInterfaceException
public class SigningInterfaceException extends java.lang.Exception Constructor Detail
   SigningInterfaceException
   public SigningInterfaceException (int errorCode, java.lang.String message)
   All signing interface library exceptions should be instantiated with this constructor setting both the error code from one of the constants specified below and an appropriate message string. The message string can be especially important in the case of OTHER_ERROR Field Detail
 PIN_BLOCKED
 public final static int PIN_BLOCKED
 The PIN for the identity key is blocked. The number of failed attempts to use the identity key has been exceeded.
 USER_ABORT
 public final static int USER_ABORT
 The user has aborted the signing operation. This may occur in any number of situations including: the user clicks a "cancel" button or closes the signing window; the user refuses to enter his or her PIN; the user has forgotten his or her PIN and does not want to continue; the user does not have or does not insert a smart card or attach a signing device supported by the implementation. The implementation may return a more detailed reason for the user abort in the message string of the exception.
 This error code should only be returned in instances where the user has some ability to continue the signing operation but chooses to cancel it. For hard errors or device errors where the user cannot choose to continue, an appropriate error or the error OTHER_ERROR should be used instead.
 CANNOT_OPEN_INPUT_STREAM
public final static int CANNOT_OPEN_INPUT_STREAM
 Error opening input stream.
 METHOD_NOT_IMPLEMENTED
 public final static int METHOD_NOT_IMPLEMENTED
 No implementation for this method exists. This error is returned in the case where the GetUtilitySignature method is not implemented.
 MIME_TYPE_NOT_SUPPORTED
 public final static int MIME_TYPE_NOT_SUPPORTED
 The MIME type of the data specified is not supported by the signing system.
 OTHER_ERROR
 public final static int OTHER_ERROR
 An unspecified error occurred. This error should be returned only if an error occurs that cannot accurately be reported using one of the other error codes. The implementation may return a more detailed reason for the error in the message string of the exception.

Method Detail
 getErrorCode
 public int getErrorCode( ) {Implementation Required}
 This method returns the error code of the Exception. The error code may be any of the error constants specified above.
 The actual value of this code should not be used directly as the value may vary between implementations. Instead this value should be compared against the named constants to determine the actual error.

Figure 5:
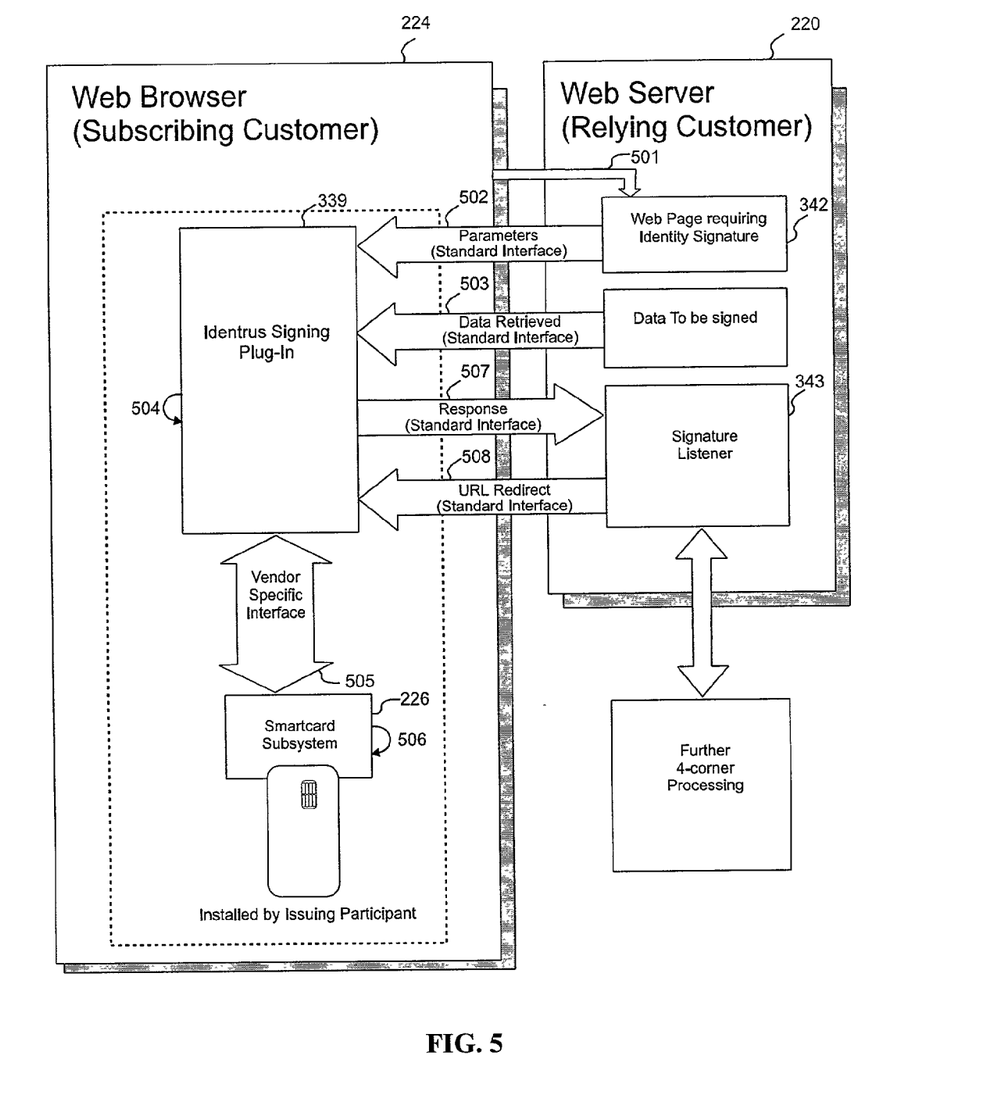

Signing Plug-In 339
 Signing plug-in 339 provides a mechanism for Web page 342 to invoke buyer 106's smartcard subsystem to execute a digital signature. Signing plug-in 339 may be implemented as a plug-in for a Netscape Navigator browser or as an ActiveX or equivalent control for a Microsoft Internet Explorer browser. Suitable formats for other browsers may also be used.
 In a preferred embodiment, an entity trusted by subscribing customer 106, such as issuing participant 102, digitally signs signing plug-in 339 and its associated libraries and provides them to the subscribing customer. Signing plug-in 339 is preferably installed so that it may be launched by, for example, an <EMBED> tag in Web page 342. In other embodiments, the World Wide Web Consortium's <OBJECT> tag may be used to invoke signing plug-in 339 for browsers that recognize this tag.
 Signing plug-in 339 may preferably be built on PKCS#11 using a Java native interface layer or a pure Java smart card interface, such as OCF and preferably is not limited to any specific smartcard interface standard. The signature returned by signing plug-in 339 is preferably in PKCS #7 format, as described below. This format is the same format used by Netscape's JavaScript crypto.signText( ) method. PKCS #7 is also a standard used for signatures in S/MIME implementations.
 FIG. 5 illustrates use of signing plug-in 339 in a preferred embodiment. As shown in FIG. 5, in step 501, subscribing customer 106 visits relying customer 108's Web site. The parties preferably authenticate themselves to each other over an SSL session with their utility keys.
 In step 502, when the seller's Web application determines that there is data that should be signed by buyer 106, a Web page is sent to browser 224 that includes an <EMBED> tag which causes signing plug-in 339 to be executed. In step 503, signing plug-in 339 communicates with Web server 220 and retrieves the data to be signed from a location specified by a DataURL parameter in the <EMBED> tag. In step 504, signing plug-in 339 initiates a signing request to sign the retrieved data, as described below.
 In step 505, signing plug-in 339 creates a signing-request dialog that displays the data to be signed to buyer 106 (i.e., the end user whose smart card will be executing the digital signature). It should be noted that if the MIME type of the data to be signed is "text/plain," it may be necessary to change the control characters "linefeed," "carriage return," and "tab" in a way that proper display of the data is guaranteed. In such cases, the data to be signed preferably remains the unmodified data.
 The signing-request dialog preferably prompts buyer 106 to approve or cancel the signing operation. In a preferred embodiment, the signing-request dialog offers buyer 106 the option to view the data to be signed in an application of his or her choice (e.g., a spreadsheet application) before deciding whether or not to proceed with signing. In addition, the signing-request dialog also offers buyer 106 the option to store or log the data to be signed.
 If buyer 106 elects to sign the data, then, in step 506, smartcard subsystem 226 asks buyer 106 to enter his or her PIN. If the buyer correctly enters the PIN, smartcard subsystem 226 executes the digital signature.
 In step 507, signing plug-in 339 forwards the results of the signing operation signature to the seller's Web site via an HTTP POST to the URL specified in a PostURL parameter in the <EMBED> tag. This URL preferably specifies a Web server application at relying customer 108 that accepts the posted data, such as plug-in listener 343. If the signing operation was successful, the results of the signing operation should be the signed data. If the signing operation was not successful, the posted results of the signing operation will be an error message, as described in more detail below.
 In step 508, plug-in listener 343 processes the received signing operation results. Plug-in listener 343 may then transmit a URL to signing plug-in 339 to redirect browser 224 to the next Web page to be displayed to buyer 106, as described below.
 In a preferred embodiment, the <EMBED> tag may take the following form:
 <EMBED
  TYPE="application/x-rootentity-signing-plug-in"

ExpectedVersion="100"
DataURL="https://someserver/data.txt"
PostURL="https://someserver/servlet-or-cgi"
Mime-type="text/plain"
Height="0"
Weight="0"
Filename="somedatafile.txt"
>
</EMBED>

The TYPE parameter is used to specify the MIME type of signing plug-in 339. This value is used when signing plug-in 339 is installed on the buyer's computer to tell Web browser 224 that signing plug-in 339 should be launched when this MIME type is encountered in a Web page received from a seller. Embodiments that employ the W3C's <OBJECT> tag preferably specify the plug-in MIME type in the tag's type parameter. In a preferred embodiment, this MIME type is preferably the same for all implementations of signing plug-in 339 distributed to buyers 106 to facilitate interoperability with all sellers' Web pages. The value of the MIME type may be any agreed upon value, such as: application/x-rootentity-signing-plug-in. In a preferred embodiment, the <EMBED> tag must contain the TYPE parameter.

The DataURL parameter is used to specify a URL from which the data to be signed may be retrieved. An exemplary value for the DataURL parameter might be: DataURL="https://someserver/data.txt". The data is preferably retrieved by signing plug-in 339 using the HTTP GET method.

Alternatively, the <EMBED> tag may contain a DataToBeSigned parameter that directly specifies the data to be signed. When this parameter is present, its value is preferably used as the data to be signed and the DataURL parameter is ignored even if included in the <EMBED> tag.

The value of the DataToBeSigned parameter is preferably a URL-encoded string having a maximum length of 1024. It is preferably interpreted as text/plain regardless of the value specified in the <EMBED> tag's Mime-type parameter. The value if preferably URL decoded before use. An exemplary value for the DataToBeSigned parameter might be: DataToBeSigned="sign%20this".

In a preferred embodiment, There is no required format for the data to be signed as it is transferred from server to client. In addition, the data to be signed is preferably used exactly as retrieved and presented to buyer 106.

The PostURL parameter is used to specify a URL to which the signing-operation results should be posted. The results are preferably posted to the specified URL using the HTTP POST method. In a preferred embodiment, this URL specifies a CGI program or script, Java servlet, or some other Web application that can accept data. An exemplary value for this parameter might be: PostURL="https://someserver/servlet-or-cgi".

In a preferred embodiment, the resource identified by the PostURL parameter may return data to be displayed to the user after the posting is complete. Signing plug-in 339 preferably does not handle this data but rather instructs Web browser 224 to display the data to the user. In a preferred embodiment, the resource identified by the PostURL parameter may instead or in addition return a URL after the posting is complete that specifies, for example, a next Web page to be displayed to the user. Redirects to the new URL are preferably handled by an HTTP redirect. In accordance with the Netscape plugin specification, this can be achieved by setting the target parameter of the NPN_PostURL function or NPN_PostURLNotify function to "_current." A preferred format for data posted from client to server is described below.

The Mime-type parameter is used to specify the MIME type of the data to be downloaded from the resource specified in the DataURL parameter. Signing plug-in 339 preferably supports at least the text/plain MIME type. In a preferred embodiment, the <EMBED> tag must contain the TYPE parameter. An exemplary value for the Mime-type parameter might be: Mime-type="text/plain".

In a preferred embodiment, if the <EMBED> tag does not contain a Mime-type parameter, signing plug-in 339 may take as a default for this parameter the MIME type specified by the Web server when signing plug-in 339 connects to the resource specified by the DataURL parameter. But if the <EMBED> tag contains a value for this parameter, that value preferably overrides any MIME type set by the resource specified by the DataURL parameter.

The Filename parameter is preferably an optional parameter that may be used to specify a filename to be used for saving the data to be signed. In a preferred embodiment, it may also be used as a guide for determining the data type where the MIME type is not sufficient. Values for the Filename parameter may take the form: Filename="somedatafile.txt".

The ExpectedVersion parameter is used to specify the version of signing plug-in 339 that the Web server expects to be running on buyer 106's computer. In a preferred embodiment, the <EMBED> tag must contain the ExpectedVersion parameter. An exemplary value for the ExpectedVersion parameter might be: ExpectedVersion="100".

In a preferred embodiment, Web pages created by seller 108 does not use the <EMBED> tag's pluginspage parameter. In a preferred embodiment, the complete size of the <EMBED> tag including the brackets and the EMBED keyword does not exceed 1024 characters. In a preferred embodiment, the case of parameter names passed to the plug-in via the <EMBED> tag is ignored. Thus, DataToBeSigned="This" is equivalent to datatobesigned="This". In a preferred embodiment, all URLs are interpreted according to the "http" scheme described in RFC 2616 or "https" scheme described in RFC 2818 (both of which are hereby incorporated by reference), and are preferably represented in absolute form.

A preferred format for signing-operation results posted by buyer 106 is now described.

Signing plug-in 339 preferably specifies the content type of posted signing-operation results as: application/x-www-form-urlencoded. It should be noted that the content type of the data may not contain the correct MIME type (application/x-www-form-urlencoded) because of certain browser implementations. The content length of the data is preferably the length of the data posted.

The posted data is preferably formatted as URL-encoded name/value pairs, where the name refers to a "posted data" parameter that describes the type of information being posted and the value refers to a value for that parameter. Thus, for example, if signing plug-in 339 determines that the requested signature cannot be executed because the data to be signed was of an unsupported MIME type, signing plug-in 339 would preferably post the following:

SigningInterfaceException=MIME_TYPE_NOT_SUPPORTED&Supported Versions=100 where SigningInterfaceException is the name of the posted-data parameter and MIME_TYPE_NOT_SUPPORTED is its value in this case.

By contrast, if the requested signature was executed successfully, signing plug-in 339 would preferably post, for example, the following:

Signature=MIIKCwYJKoZIhvcNAQcCoIIJ/DCCCfg-CAQExCzAJBgUrDg
MCGgUAMCQYDVQQGEwJVUzAeFw05OTEx
MDgxOTExMTNaFw0w MDExMDgxOTExMT-NaMHkxHTAbBgNVBAM
TFFN0ZXZ1IFBoYW0G
OTQyMDg4MjczMSYwJAYJKoZIhvcNAQkBExdz-dGV2ZS5waGFtQGxp dHJv . . . &SupportedVersions=100 where Signature is the name of the posted-data parameter and the sequence to the right of the equal sign is the parameter's value in this case (i.e., the digital signature). As will be recognized, the value of the data is cut off by ". . . " to preserve space, although the signature might be significantly longer than the string reproduced above. The value of a signature is preferably without line breaks. A Base64 encoded signature is preferably additionally URL encoded.

In a preferred embodiment, the system supports the following posted-data parameters:

Signature

The value of this parameter is preferably a Base64 encoded string containing the signature in PKCS #7 format.

SigningInterfaceException

The value of this parameter is preferably a fixed set of strings specifying the error. Preferred values for this parameter are described below. An exemplary value for this parameter might be:

SigningInterfaceException=MIME_TYPE_NOT_SUPPORTED.

SupportedVersions

The value of this parameter is preferably a comma-separated list of version numbers supported by the buyer's system. An exemplary value for this parameter might be: SupportedVersions=100, 101, 103.

In a preferred embodiment, every data post contains either a Signature or SigningInterfaceException parameter (depending on whether or not the signature request resulted in a digital signature or an exception), and always contains a SupportedVersions parameter. In a preferred embodiment, proper capitalization is preferably used for Post parameters when posting data to a server.

In a preferred embodiment, the system supports the following error codes which, as noted above, are preferably posted as string values of the SigningInterfaceException parameter:

VERSION_NOT_SUPPORTED

This value is preferably posted if the value of the ExpectedVersion parameter is not supported.

PARAMETER_TOO_LONG

This value is preferably posted if a parameter value exceeded the maximum allowable length.

INSUFFICIENT_PARAMETERS

This value is preferably posted if one or more required parameters are missing.

PIN_BLOCKED

This value is preferably posted if the PIN for the identity key is blocked. This may occur, for example, if the number of failed attempts to use the identity key exceeded a predefined maximum.

USER_ABORT

This value is preferably posted if the user has aborted the signing operation by refusing to enter his or her PIN. This may be caused by several circumstances including: the user clicks a "cancel" button on the PIN dialog or closes the signing-dialog window; the user refuses to enter his or her PIN; the user has forgotten his or her PIN and does not want to continue; the user does not have or does not insert a smart card or attach a signing device supported by the system. If desired, the signing plug-in 339 may return a more detailed reason for the user abort in the message string of the exception.

This error code is preferably only returned in instances where the user has some ability to continue the signing operation. For hard errors or device errors where the user cannot choose to continue, another appropriate value or the OTHER_ERROR value should preferably be posted.

MIME_TYPE_NOT_SUPPORTED

This value is preferably posted if the MIME type of the data specified is not supported by the system.

DATA_NOT_RETRIEVED

This value is preferably posted if there was a problem retrieving the data to be signed. This may occur, for example, if either the URL specified was incorrect or the data could not be retrieved from the URL for some reason. In a preferred embodiment, no error results if content length is zero but data has been sent.

OTHER_ERROR

This value is preferably posted if an unspecified error occurred. This error is preferably returned only if an error occurs that cannot accurately be reported using one of the other error codes. If desired, signing plug-in 339 may return a more detailed reason for the error in the message string of the exception.

In a preferred embodiment, the above-described signing interface may be integrated with other components to facilitate access by customers 106, 108 to system services provided by participants 102, 104. These services may include, for example, a warranty service such as that described in U.S. provisional application Ser. No. 60/224,994, filed Aug. 14, 2000, entitled Signing Interface Requirements, Smart Card Compliance Requirements, Warranty Service Functional Requirements, and Additional Disclosure and U.S. application Ser. No. 10/038,711 filed Jan. 4, 2002, entitled System and Method for Providing Warranties in Electronic Commerce, which are herby incorporated by reference. A preferred embodiment, for using the above-described signing interface to obtain a warranty for a subscribing customer's digital signature is now described in connection with FIG. 6.

Figure 6:
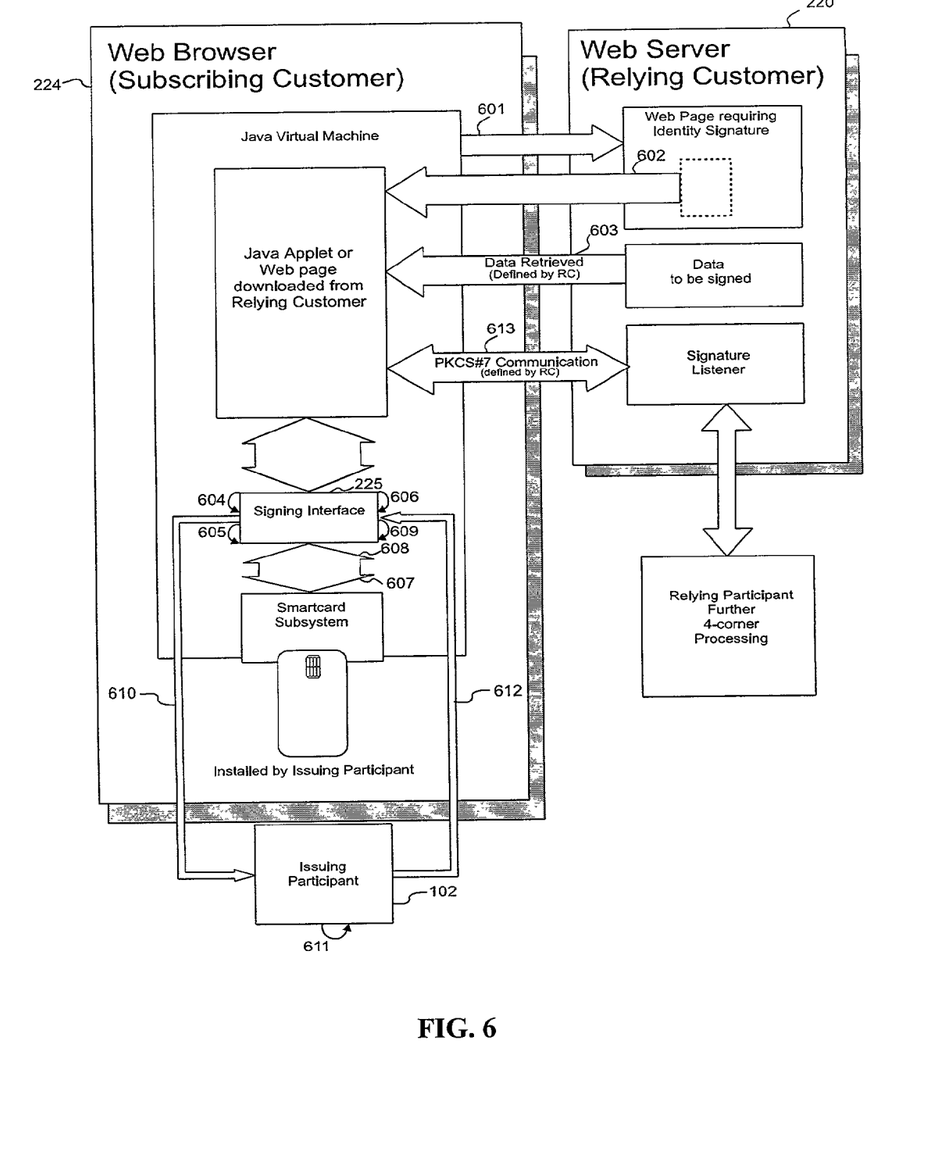
FIG. 6 illustrates a preferred embodiment for providing a system service to a customer.

In step 602, when the seller's Web application determines that there is data that should be signed by buyer 106, a Web page is sent to browser 224 that launches signing interface 225. In step 603, signing interface 225 retrieves the data to be signed. In step 604, signing interface 225 determines whether buyer 106 must obtain a warranty for the digital signature before submitting the signed data to seller 108. For example, the seller's Web page may state that it will not accept the customer's digital signature unless it is accompanied by a warranty from issuing participant 102. Alternatively, the Web page may include a set of <EMBED> tags that indicate the seller's requirement for a warranty and cause buyer 106's signing plug-in 339 to prompt the buyer to request a warranty from issuing participant 102, as described below.

In a preferred embodiment, seller 108 may specify a set of rules that signing interface 225 applies to determine whether to prompt the buyer to request a warranty for the digital signature. For example, seller 108 may specify that certain buyers 106 must obtain a warranty for their digital signatures, or may specify that digital signatures for transactions above a certain amount must be accompanied by a warranty.

In step 605, signing interface 225 displays a signing-request dialog to buyer 106. The signing-request dialog displays the data to be signed to buyer 106 and asks the buyer whether or not he or she agrees to sign the data or would like to cancel the signing operation. In step 606, if buyer 106 elects to sign the data, signing interface 225 prompts subscribing customer 106 for its PIN.

In step 607, once the buyer enters the PIN, signing interface 225 transmits the data to be signed to smartcard subsystem 226. In step 608, smartcard subsystem 226 signs the data and returns the digital signature to signing interface 225.

If no warranty is to be obtained, system operation continues as described above in connection with FIGS. 4 and 5. Otherwise, in step 609, signing interface 225 displays a warranty-request dialog to buyer 106. This dialog may be caused to pop up by a set of <EMBED> tags in Web page 342 or by a call to signing interface library 338. The warranty-request dialog preferably asks the buyer whether or not he or she would like to request a warranty for the digital signature. The dialog may inform the user that failure to request a warranty may result in the transaction with seller 108 being canceled.

In step 610, if the buyer elects to request a warranty, signing interface 225 constructs a warranty request for the digital signature and transmits the request to issuing participant 102. In step 611, issuing participant 102 determines whether to issue the warranty. Additional steps involving root entity 110 may also be involved in this determination as described, for example, in application Ser. No. 09/657,605, filed Sep. 8, 2000, entitled System and Method for Providing Certificate Validation and Other Services, which is hereby incorporated by reference.

In step 612, if issuing participant determines that it will issue the requested warranty, it creates the warranty by digitally signing a message warranting the digital signature and transmitting the signed warranty to buyer 106. In step 613, signing interface 225 appends the signed warranty to the digital signature and includes the warranty with the signing-request results returned to seller 108.

In a preferred embodiment, subscribing customer 106's signature is formatted according to PKCS #7 v. 1.5 RSA Cryptographic Message Syntax Standard and is Base64 encoded for transport. The encrypted digest within the PKCS #7 object is preferably encrypted according to RSASSA-PKCS-v1_5 (Reference PKCS #1 v2.0). The PKCS#7 (v1.5) object is a ContentInfo object of type SignedData.

In a preferred embodiment, the signature comprises a SignedData object. The fields of the SignedData object preferably have the following values:

| Field | Value |
| --- | --- |
| Version | (version number, e.g., 1) |
| digestAlgorithms | SHA-1 object identifier |
| contentInfo.contenttype | PKCS#7 Data object identifier |
| contentInfo.content | Not present. The data signed is preferably not included in the signedData object |

-continued

| Field | Value |
| --- | --- |
| certificates | Buyer 106's certificate plus the entire certificate chain up to but not including root 110. |
| Crls | Not present. |
| signerInfo.version | (version number, e.g., 1) |
| signerInfo.issuerAndSerialNumber | The issuer and serial number of buyer 106's certificate. |
| signerInfo.digestAlgorithm | SHA-1 object identifier |
| signerInfo.authenticatedAttributes | Three attributes are preferably present: A PKCS #9 content type attribute whose value is the same as SignData's contentInfo.contentType. In this case this is the PKCS #7 Data object identifier. A PKCS #9 message digest attribute whose value is the message digest of the content. A PKCS #9 signing time attribute, whose value is the time that the object was signed. |
| signerInfo.digestEncryptionAlgorithm | PKCS #1 sha1WithRSAEncryption object identifier |
| signerInfo.encryptedDigest | the result of encrypting the message digest (BER encoded DigestInfo) of the complete DER encoding of the Attributes value contained in the authenticatedAttributes field with the signer's private key. The data is preferably encrypted according to RSASSA-PKCS-v1_5 (Reference PKCS #1 v2.0). |
| signerInfo.unauthenticatedAttributes | CSSD data if implemented. See below. |

In a preferred embodiment, the SignedData object may include card & signature security data (CSSD) generated by issuing participant 102 as part of its risk management process, as noted in provisional application Ser. No. 60/224,994, filed Aug. 14, 2000, entitled Signing Interface Requirements, Smart Card Compliance Requirements, Warranty, Service Requirements, and Additional Disclosure, which is hereby incorporated by reference. CSSD may preferably be implemented as a bit-string in an unauthenticated attribute of the signerInfo field, as follows:

```
cssdAttribute ATTRIBUTE ::= {
    WITH SYNTAX cssdSignature
    ID thisHasToBeDefinedByRootEntity - The root entity preferably
    defines this OID
}
cssdSignature ::= SEQUENCE {
    cssdInputData       OCTET STRING
    algorithmIdentifier AlgorithmIdentifier
    cssd                BIT STRING
}
```

In a preferred embodiment, root entity 110 establishes interoperability requirements, functional requirements, and security requirements for signing interface 225, its use, and distribution. In particular, root entity 110 preferably specifies the following interoperability, functional, and security requirements:

1 Interoperability Requirements

For signing applications at the relying customer to properly operate across all subscribing customers' client software implementations, each subscribing customer's smartcard system must conform to the following requirements.

1.1 Signing Interfaces 1.1.1. Issuing Participant Implementations Provided to the Subscribing Customer To support application-level digital signatures, the issuing participant shall supply the subscribing customer with both:

An implementation of the signing interface library which shall implement the Java API and data formats specified above.

An implementation of the signing plug-in, which shall implement the model of invocation and data formats specified above.

1.1.2 Relying Customer Use of the Signing Interfaces

To support application-level digital signatures, the relying customer shall implement the use of either (or both):

The use of the signing interface library by creating a signed Java applet (signed by the relying participant) which uses the Java API of the signing interface library specified above;

The model of invocation and data formats for the signing plug-in specified above.

2 Functional Requirements

To ensure integrity and non-repudiation in the signing process, the following requirements must be met in the implementation of all signing interfaces provided to the subscribing customer by the issuing participant.

2.1 Non-Repudiation Signing

All non-repudiation signing must be done with the identity key for both the signing interface library and signing plug-in interfaces.

When an identity signature is requested through either interface, the implementation must automatically select the identity key and must not allow the user to select an inappropriate key for non-repudiation signing such as the utility key.

2.2 Support of MIME Types

All signing interface implementations shall at a minimum support the plain text MIME type 'text/plain'.

If data presented to the signing interface has a MIME type that is unsupported by the signing interface implementation, then the interface should return the MIME_TYPE_NOT_SUPPORTED error appropriate to that interface.

2.3 Display of Data

All signing interfaces shall implement a mechanism that displays the data to be signed (returned by the Web server to the client) to the user, and allows the user to make a final decision about whether to sign the data.

2.4 Ability to Save Data to be Signed

All signing interfaces shall implement a mechanism that gives the user the option to save the data being signed. This allows the user to view the data in the program of his or her choice before deciding whether to proceed with the transaction or to log it.

2.5 Smart Card System Requirements

The requirements of the smartcard system must be adhered to as specified by IT-SCR (provisional patent application serial No. 60/224,994, filed Aug. 14, 2000, entitled Signing Interface Requirements, Smart Card Compliance Requirements, Warranty Service Functional Requirements, and Additional Disclosure, which is hereby incorporated by reference). For example, a user PIN is required from the user every time the identity signature is requested. The smartcard subsystem software and drivers rather than the signing interface may implement these requirements. But the requirements must not be bypassed by the signing interface. All required methods pertaining to each interface must be implemented while optional methods should return the designated "not supported" message if not implemented.

2.6 Card & Signature Security Data (CSSD)

Issuing participants may generate card & signature security data (CSSD) as part of their risk management process. This functionality is defined in IT-SCR. CSSD functionality in the smartcard subsystem is optional as specified in IT-SCR.

If CSSD functionality is implemented at the smartcard level, then it is required that this data be inserted into the PKCS#7 object (described above) that is returned as a signature to the relying customer.

2.7 URL Interpretation

URL's shall be interpreted in the broadest sense as either URL's or URI's.

URL's may be specified as relative paths.

3 Security Requirements 3.1 Code Signing

All Java code implementing or using the subject matter disclosed herein shall be digitally signed.

3.2 Restrictions of Relying Customer Java Code

If the relying customer implements use of the signing interface library, it is essential that there is clear delimitation of the roles of the Java library (supplied by the issuing participant) and Java applet (supplied by the relying participant) in obtaining signatures from a smart card.

A relying customer Java applet for use in the present system shall not implement any graphical user interface (or other user interface) functions that displays the data to be signed or confuse the branding of the signing interface. And it shall not alter the form or content of the data to be signed by the user's smart card. The signing interfaces have the sole responsibility for branding the GUI through which the user views the data and access the smartcard functions.

It should be noted that although the present invention is described in connection with a Web-based client embodiment, the present invention may be implemented in non-browser type environments such as those found in automated systems.

While the invention has been described in conjunction with specific embodiments, it is evident that numerous alternatives, modifications, and variations will be apparent to those skilled in the art in light of the foregoing description.

What is claimed is:

1. Apparatus for facilitating digital signing of electronic data, said apparatus comprising:
   a browser;
   coupled to the browser, a signing module; and
   coupled to the browser and to the signing module, a signing interface, the signing interface adapted to be invoked by an executable software program transmitted to the browser from a remote location, and to:
   forward data to be signed to the signing module, receive a digital signature for the data to be signed from the signing module, and forward the digital signature to the remote location;

wherein the signing interface comprises a signing plug-in and a signing interface library having an API.

2. The apparatus of claim 1, wherein the signing interface comprises a signing interface library having an API, and the executable software program is an applet referenced in a Web page transmitted to the browser from a Web server.

3. The apparatus of claim 2, wherein the applet is adapted to retrieve the data to be signed from a remote location and to forward the data to be signed to the signing interface.

4. The apparatus of claim 2, wherein the applet is digitally signed.

5. The apparatus of claim 1, wherein the signing interface comprises a signing plug-in and the executable software program comprises a Web page comprising a tag adapted to launch the signing plug-in.

6. The apparatus of claim 5, wherein the tag is an <EMBED> tag.

7. The apparatus of claim 5, wherein the tag is an <OBJECT> tag.

8. The apparatus of claim 1, wherein the data to be signed is retrieved from a remote location specified by the executable software program.

9. The apparatus of claim 1, wherein the data to be signed is included in the executable software program.

10. The apparatus of claim 1, wherein the signing module digitally signs the data to be signed with an identity key.

11. The apparatus of claim 1, wherein the signing module is a smart card subsystem.

12. The apparatus of claim 1, wherein the digitally signed data includes card and signature security data.

13. The apparatus of claim 1, wherein the signing interface is obtained from a trusted entity.

14. The apparatus of claim 13, wherein the signing interface is digitally signed by the trusted entity.

15. The apparatus of claim 14, wherein the trusted entity is an issuing financial institution.

16. The apparatus of claim 1, wherein the signing interface comprises a user interface.

17. The apparatus of claim 16, wherein the user interface displays the data to be signed to a user, and, prior to the signing interface obtaining the digital signature from the signing module, obtains the user's approval to sign the data.

18. The apparatus of claim 16, wherein the user interface offers a user an opportunity to store the data to be signed.

19. The apparatus of claim 16, wherein the user interface offers a user an opportunity to view the data to be signed in a software application.

20. The apparatus of claim 19, wherein the software application is a spreadsheet.

21. A method for facilitating digital signing of electronic data, said method comprising the steps of:

a browser receiving an executable software program from a remote location;

the executable software program triggering a signing interface, coupled to the browser, to forward data to be signed to a signing module;

the signing module sending to the signing interface a digital signature for the data to be signed; and the signing interface forwarding the digital signature to the remote location;

wherein the signing interface comprises a signing plug-in and a signing interface library having an API.

22. The method of claim 21, wherein the signing interface comprises a signing interface library having an API and the executable software program is an applet referenced in a Web page transmitted to the browser from a Web server.

23. The method of claim 22, wherein the applet is adapted to retrieve the data to be signed from a remote location and to forward the data to be signed to the signing interface.

24. The method of claim 22, wherein the applet is digitally signed.

25. The method of claim 21, wherein the signing interface comprises a signing plug-in and the executable software application comprises a Web page comprising a tag adapted to launch the signing plug-in.

26. The method of claim 25, wherein the tag is an <EMBED> tag.

27. The method of claim 25, wherein the tag is an <OBJECT> tag.

28. The method of claim 21, wherein the data to be signed is retrieved from a remote location specified by the executable software program.

29. The method of claim 21, wherein the data to be signed is included in the executable software program.

30. The method of claim 21, wherein the signing module digitally signs the data to be signed with an identity key.

31. The method of claim 21, wherein the signing module is a smart card subsystem.

32. The method of claim 21, wherein the digitally signed data includes card and signature security data.

33. The method of claim 21, wherein the signing interface is obtained from a trusted entity.

34. The method of claim 33, wherein the signing interface is digitally signed by the trusted entity.

35. The method of claim 34, wherein the trusted entity is an issuing financial institution.

36. The method of claim 21, wherein the signing interface comprises a user interface.

37. The method of claim 36, wherein, prior to the step of the signing module sending to the signing interface a digital signature, the user interface displays the data to be signed to a user and obtains the user's approval to sign the data.

38. The method of claim 36, wherein the user interface offers a user the opportunity to store the data to be signed.

39. The method of claim 36, wherein the user interface offers a user an opportunity to view the data to be signed in a software application.

40. The method of claim 39, wherein the software application is a spreadsheet.

41. Apparatus for facilitating digitally signing data by a first customer, said apparatus comprising:

a browser;

coupled to the browser, a signing module;

coupled to the browser and to the signing module, a signing interface, the signing interface being adapted to facilitate access to system services provided via a four-corner model comprising a root entity, a first financial institution, a second financial institution, the first customer, and a second customer, the second customer maintaining a second-customer computer system;

coupled to the browser, means for downloading an executable software program from the second-customer computer system to the browser;

coupled to the downloading means, means for invoking the signing interface;

coupled to the invoking means, means for determining whether to request a system service;

coupled to the determining means, means for creating a service request for the system service;

coupled to the creating means, means for transmitting the service request;

coupled to the transmitting means, means for receiving a response to the service request;

coupled to the means for receiving a response, means for forwarding the data to be signed to the signing module;

coupled to the forwarding means, means for receiving a digital signature for the data to be signed from the signing module; and coupled to the means for receiving a digital signature, means for forwarding the digital signature to a remote location specified by the executable software program;

wherein the signing interface comprises a signing plug-in and a signing interface library having an API.

42. The apparatus of claim 41, wherein the determining means comprises means for presenting to the first customer an option to request a system service.

43. The apparatus of claim 42, wherein the system service is a warranty.

44. The apparatus of claim 43, wherein the response to the service request comprises a warranty and the warranty is forwarded with the digital signature to the remote location specified by the executable software program.

45. A method for accessing system services provided via a four-corner model, the four corner model comprising:
   a root entity;
   a first financial institution;
   a second financial institution;
   a first customer, said first customer being a customer of the first financial institution, said first customer maintaining a first-customer computer system, said first-customer computer system comprising:
      a browser,
      a signing module,
      and a signing interface; and
   a second customer, said second customer being a customer of the second financial institution, said second customer maintaining a second-customer computer system, said second-customer computer system comprising a Web server adapted to send an executable computer program to the first-customer computer system's browser, the method comprising the steps of:

invoking the signing interface;
retrieving data to be signed from a remote location;
determining whether to request a system service;
creating a service request for the system service;
transmitting the service request;
receiving a response to the service request;
forwarding the data to be signed to the signing module;
receiving a digital signature for the data to be signed from the signing module; and
forwarding the digital signature to the remote location; wherein the signing interface comprises a signing plug-in and a signing interface library having an API.

46. The method of claim 45, further comprising the step of presenting to the first customer an option to request a system service.

47. The method of claim 46, wherein the system service is a warranty.

48. The method of claim 45, wherein the response to the service request comprises a warranty and the warranty is forwarded with the digital signature to the remote location.

* * * * *